United States Patent
Bastide et al.

(10) Patent No.: US 12,322,200 B2
(45) Date of Patent: Jun. 3, 2025

(54) EMOTIONAL RESPONSE EVALUATION FOR PRESENTED IMAGES

(71) Applicant: INTERNATIONAL BUSINESS MACHINES CORPORATION, Armonk, NY (US)

(72) Inventors: Paul R. Bastide, Ashland, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 17/304,784

(22) Filed: Jun. 25, 2021

(65) Prior Publication Data

US 2022/0414368 A1    Dec. 29, 2022

(51) Int. Cl.
| | |
|---|---|
| G06V 40/16 | (2022.01) |
| G06F 18/2113 | (2023.01) |
| G06F 18/22 | (2023.01) |
| G06N 20/00 | (2019.01) |
| G06V 10/75 | (2022.01) |
| G06V 40/10 | (2022.01) |

(52) U.S. Cl.
CPC .......... *G06V 40/10* (2022.01); *G06F 18/2113* (2023.01); *G06F 18/22* (2023.01); *G06N 20/00* (2019.01); *G06V 10/751* (2022.01)

(58) Field of Classification Search
CPC .... G06V 40/10; G06V 10/751; G06V 40/174; G06F 18/2113; G06F 18/22; G06N 20/00
See application file for complete search history.

(56) References Cited

U.S. PATENT DOCUMENTS

| | | |
|---|---|---|
| 9,092,421 B2 | 7/2015 | Chowdhury |
| 10,050,926 B2 | 8/2018 | Ebersman |

(Continued)

FOREIGN PATENT DOCUMENTS

EP    2420277 A1    2/2012

OTHER PUBLICATIONS

Danowski, et al., "A Semantic Network Approach to Measuring Sentiment," Quality & Quantity (2021) 55, Jun. 12, 2020, pp. 221-255, <https://doi.org/10.1007/s11135-020-01000-x>.

(Continued)

*Primary Examiner* — Amandeep Saini
*Assistant Examiner* — Mehrazul Islam
(74) *Attorney, Agent, or Firm* — Elliot J. Shine (57) ABSTRACT

A method, computer system, and a computer program product for image evaluation is provided. The present invention may include extracting one or more individual objects from an image. The present invention may include determining a general sentiment for each of the one or more individual objects. The present invention may include determining a personal sentiment score each of the one or more individual objects. The present invention may include generating an overall sentiment score for the image based on at least the general sentiment score for each of the one or more individual objects and the personal sentiment score for each of the one or more individual objects. The present invention may include determining the overall sentiment score for the image exceeds a personal threshold of a user. The present invention may include providing one or more improvement mechanisms to the user.

22 Claims, 5 Drawing Sheets

(56) References Cited

U.S. PATENT DOCUMENTS

| | | |
|---|---|---|
| 10,943,407 B1 | 3/2021 | Morgan |
| 2002/0087052 A1 | 7/2002 | Zadrozny |
| 2012/0265811 A1* | 10/2012 | Bist .................. H04L 67/02 |
| | | 709/204 |
| 2014/0088944 A1* | 3/2014 | Natarajan ............ G06Q 30/02 |
| | | 703/13 |
| 2015/0088542 A1 | 3/2015 | Balassanian |
| 2015/0169987 A1* | 6/2015 | Nalawadi ............ G06V 20/20 |
| | | 382/181 |
| 2015/0229531 A1* | 8/2015 | O'Sullivan ........... G06Q 50/01 |
| | | 709/223 |
| 2016/0063874 A1* | 3/2016 | Czerwinski ........... G16H 50/20 |
| | | 434/236 |
| 2017/0220578 A1* | 8/2017 | Kazi .................... G06Q 50/01 |
| 2018/0048614 A1* | 2/2018 | Greenberger .......... H04L 51/52 |
| 2018/0109482 A1* | 4/2018 | DeLuca ................ G06N 20/00 |
| 2019/0005315 A1* | 1/2019 | Barros .................. H04N 23/60 |
| 2019/0286540 A1* | 9/2019 | Bates .................... G06F 18/23 |
| 2019/0332694 A1* | 10/2019 | Tcherechansky ... G06F 16/5866 |
| 2019/0392953 A1* | 12/2019 | Steuer ................. G16H 40/67 |
| 2020/0135039 A1* | 4/2020 | Karna ................. G06V 40/174 |
| 2020/0160198 A1* | 5/2020 | Reeves ................ G06N 3/006 |
| 2020/0387756 A1* | 12/2020 | Takehara ............. G06N 20/00 |

OTHER PUBLICATIONS

Disclosed Anonymously, "Image Detection Based Evaluation of User Health Issues," IP.com Prior Art Database Technical Disclosure, IP.com No. IPCOM000250153D, Jun. 6, 2017, 3 pages.

Disclosed Anonymously, "Method for Predicting Social Media Sentiment for Images," IP.com Prior Art Database Technical Disclosure, IP.com No. IPCOM000253538D, Apr. 9, 2018, 5 pages.

Disclosed Anonymously, "Person-Based Cognitive Routines to Maintain Health and Life Quality," IP.com Prior Art Database Technical Disclosure, IP.com No. IPCOM000263328D, Aug. 18, 2020, 6 pages.

Disclosed Anonymously, "Using Sentiment Analysis on Diet Patterns and Food to Avoid Negative Impacts on Mood and Health," IP.com Prior Art Database Technical Disclosure, IP.com No. IPCOM000248754D, Jan. 6, 2017, 4 pages.

Mell et al., "The NIST Definition of Cloud Computing," National Institute of Standards and Technology, Special Publication 800-145, Sep. 2011, pp. 1-7.

* cited by examiner

EMOTIONAL RESPONSE EVALUATION FOR PRESENTED IMAGES

BACKGROUND

The present invention relates generally to the field of computing, and more particularly to image evaluation.

On a daily basis an individual may be exposed to innumerable images across online platforms, such as, but not limited to, social media platforms, news websites, messaging platforms, amongst others, as well as images captured by the individual themselves. These images and/or the one or more individual objects that comprise the image may evoke unique responses from individual to individual depending on at least the color, size, and position of the one or more individual objects within these images.

Furthermore, the one or more individual objects within these images may have an associated meaning responsible for evoking unique responses from individual to individual.

SUMMARY

Embodiments of the present invention disclose a method, computer system, and a computer program product for image evaluation. The present invention may include extracting one or more individual objects from an image. The present invention may include determining a general sentiment for each of the one or more individual objects. The present invention may include determining a personal sentiment score each of the one or more individual objects. The present invention may include generating an overall sentiment score for the image based on at least the general sentiment score for each of the one or more individual objects and the personal sentiment score for each of the one or more individual objects. The present invention may include determining the overall sentiment score for the image exceeds a personal threshold of a user. The present invention may include providing one or more improvement mechanisms to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for image evaluation. As such, the present embodiment has the capacity to improve the technical field of image and sentiment analysis by providing one or more improvement mechanisms to a user for an image exceeding a personal threshold of the user. More specifically, the present invention may include extracting one or more individual objects from an image. The present invention may include determining a general sentiment for each of the one or more individual objects. The present invention may include determining a personal sentiment score each of the one or more individual objects. The present invention may include generating an overall sentiment score for the image based on at least the general sentiment score and the personal sentiment score for each of the one or more individual objects of the image. The present invention may include determining the overall sentiment score for the image exceeds a personal threshold of a user. The present invention may include providing one or more improvement mechanisms to the user.

As described previously, on a daily basis an individual may be exposed to innumerable images across online platforms, such as, but not limited to, social media platforms, news websites, messaging platforms, amongst others, as well as images captured by the individual themselves. These images and/or the one or more individual objects that comprise the image may evoke unique responses from individual to individual depending on at least the color, size, and position of the one or more individual objects within these images.

Furthermore, the one or more individual objects within these images may have an associated meaning responsible for evoking unique responses from individual to individual.

Therefore, it may be advantageous to, amongst other things, extract one or more individual objects from an image, determine a general sentiment score for each of the one or more individual objects, determine a personal sentiment score for each of the one or more individual objects, generate an overall sentiment score for the image based on at least the general sentiment score and the personal sentiment score for each of the one or more individual objects of the image, and determine the overall sentiment score for the image exceeds the personal threshold of the user.

According to at least one embodiment, the present invention may improve the identifying of images which may have a negative effect on a user by broadening the image analysis process to include both a general and personal sentiment analysis of the one or more alternative meanings associated with an individual object extracted from the image. Accordingly, the invention not only looks at the image itself but also what the image may remind a user of.

According to at least one embodiment, the present invention may improve identifying images which may have a negative effect on the user by utilizing user characteristics in identifying the one or more similar individual objects for each of the one or more individual objects of the image.

According to at least one embodiment, the present invention may improve determining a user specific sentiment for an image by generating an overall sentiment score for the image based on at least a general sentiment score and a personal sentiment score. The personal sentiment score being determined based on at least user content, user information, and/or biometric sensor data.

According to at least one embodiment, the present invention may improve the mental health of a user by providing one or more improvement mechanisms to a user prior to the user viewing an image.

According to at least one embodiment, the present invention may improve mental health of the user by continuously adjusting the personal threshold of the user by a machine learning model. The machine learning model comparing real time data with historical data stored in a knowledge corpus, which may allow the machine learning model to detect changes in at least biometric sensor data of the user.

According to at least one embodiment, the present invention may improve sentiment analysis of an image by weighting at least, more recent content, confidence scores, and the similarity of the one or more similar individual objects in determining the sentiment for each of the one or more objects of the image.

According to at least one embodiment, the present invention may improve the mental health of users of social media platforms by providing image insights to a user prior to a user disseminating an image on the social media platform. The image insights may allow a user to see how the image may affect one or more users within the user's network.

According to at least one embodiment, the present invention may improve the mental health of a user by providing a user one or more improvement mechanisms when the overall sentiment score for the image exceeds a personal threshold of the user. The one or more improvement mechanisms may reduce an unprepared invocation of stress and/or other negative reaction by the user.

According to at least one embodiment, the present invention may improve user experience by altering one or more properties of at least one individual object of an image such that the overall sentiment score for the image is adjusted below the personal threshold of the user.

Figure 1:
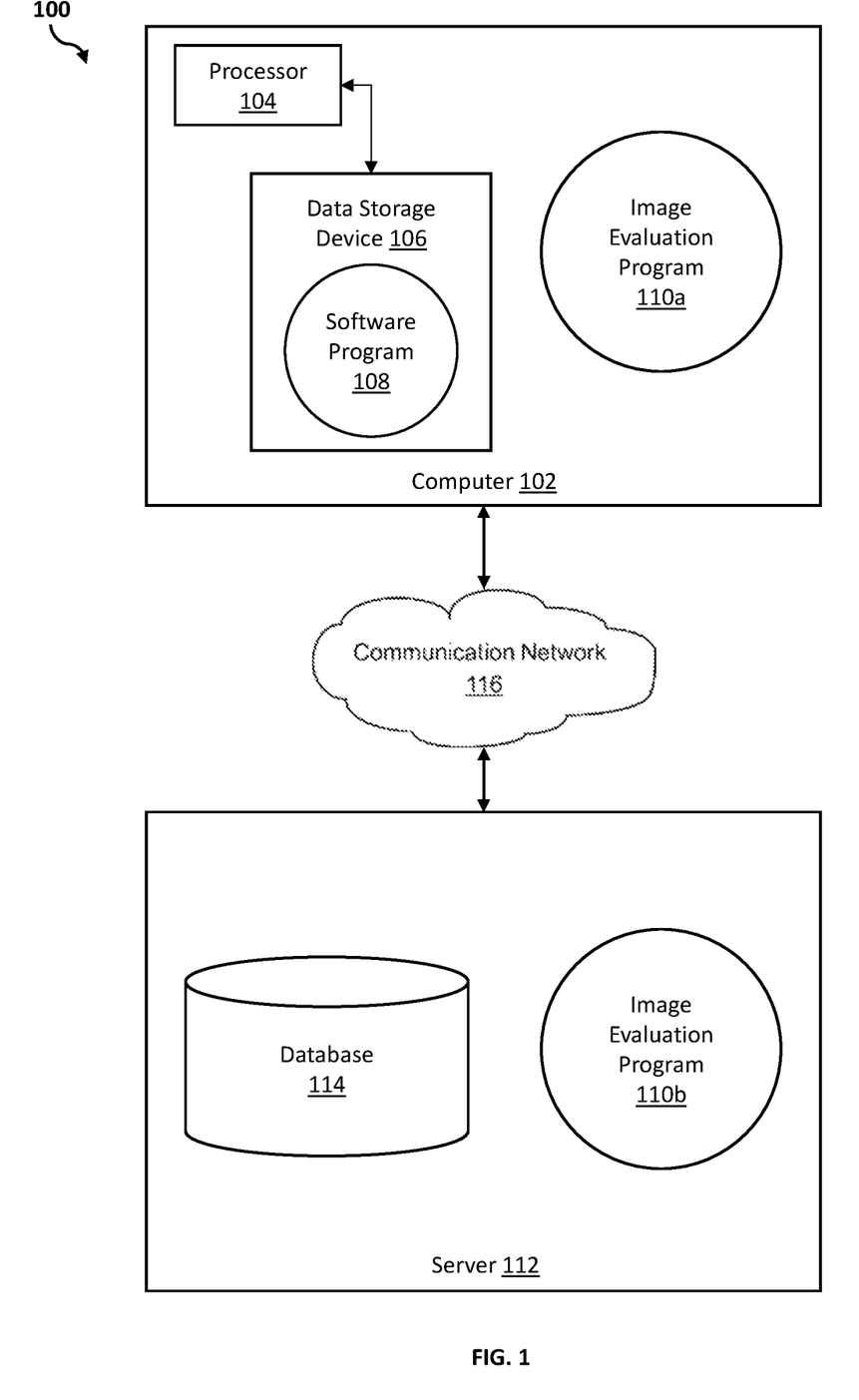
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an image evaluation program 110a. The networked computer environment 100 may also include a server 112 that is enabled to run an image evaluation program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the image evaluation program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the image evaluation program 110a, 110b (respectively) to provide one or more improvement mechanisms to a user for an image exceeding a personal threshold of the user. The image evaluation method is explained in more detail below with respect to FIG. 2.

Figure 2:
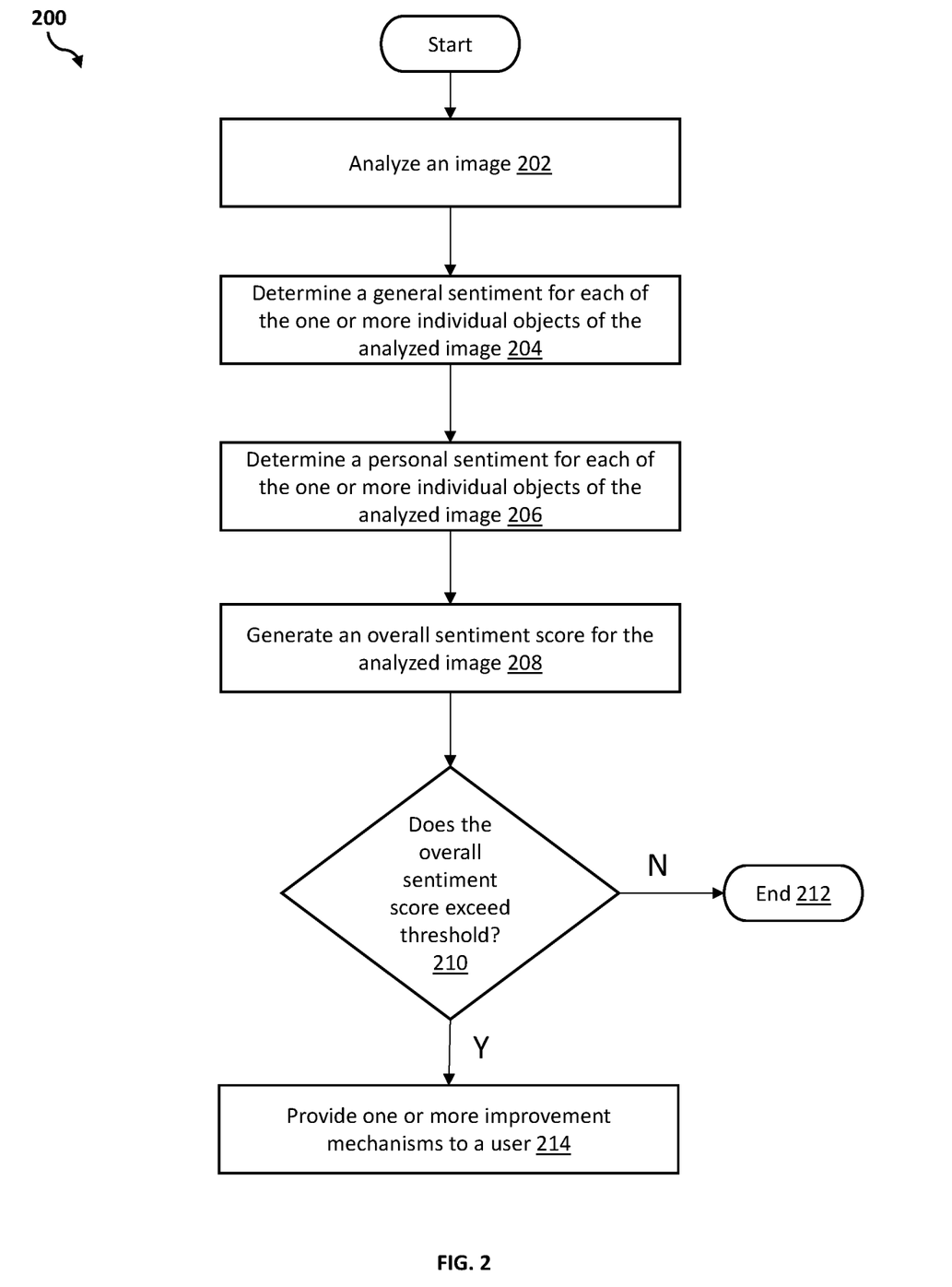
FIG. 2 is an operational flowchart illustrating a process for image evaluation according to at least one embodiment.

Referring now to FIG. 2, an operational flowchart illustrating the exemplary image evaluation process 200 used by the image evaluation program 110a and 110b (hereinafter image evaluation program 110) according to at least one embodiment is depicted.

At 202, the image evaluation program 110 analyzes an image. An image may include, but is not limited to including, thumbnails, videos, segments and/or key bits of videos, amongst other visual content. The image evaluation program 110 may identify an image to analyze based on a user. The image evaluation program 110 may retrieve one or more images from at least, a user's social media feed, websites frequently visited by a user, images sent to the user on a messaging platform, amongst other image mediums and/or online platforms.

The image evaluation program 110 may analyze the image retrieved from the image medium and/or online platform utilizing one or more image analysis tools. The image evaluation program 110 may utilize one or more image analysis tools in extracting one or more individual objects from the image, such as, but not limited to, OpenCV™ (Open CV and all Open-CV-based trademarks or registered trademarks of Open Source Computer VisionLibrary in the United States and/or other countries), ImageJ/FIJI, amongst others. The one or more image analysis tools may extract the one or more individual objects from the image using one or more object segmentation techniques. Object segmentation techniques may include pre-trained classifiers, which may be used to ident/detect the one or more individual objects of the image. The image evaluation program 110 may set one or more parameters aspect to extracting the one or more individual objects from the image, the one or more parameters may include, but are not limited to including, a numerical limit on individual objects to be extracted from an image, granularity of individual objects to be extracted from an image, centrality of an individual object to an image, amongst other parameters.

The image evaluation program 110 may determine an associated meaning for each of the one or more individual objects extracted from the image. The image evaluation program 110 may utilize at least pre-trained classifiers of the one or more image analysis tools, a knowledge corpus (e.g., database 114) maintained by the image evaluation program 110, object-based image analysis, a Convolutional Neural Network (CNN), supervised/unsupervised image classification, amongst other classification techniques in determining the associated meaning for each of the one or more individual objects of the image. The associated meaning may define an individual object of the image. For example, the image evaluation program 110 may determine the associated meaning for an individual object extracted from an image is "car". The image evaluation program 110 may improve a specificity of the associated meaning for an individual object as more images are analyzed. Continuing with the example in which the associated meaning is "car," as more images are analyzed the image evaluation program may determine the associated meaning for the individual object is "car" but also include the year, manufacturer, model, amongst other details.

The image evaluation program 110 may also utilize one or more properties of the one or more individual objects as well as the one or more image analysis tools in determining if each of the one or more individual objects has an alternative associated meaning. The image evaluation program 110 may utilize the one or more properties of the one or more individual objects, which may include, but are not limited to including, shape, size, orientation, color, texture, amongst other properties, in identifying one or more similar individual objects within other images. For example, the associated meaning for a cloud is "cloud" but the alternative associated meaning may be a person, place, or thing with at least one similar property to the observed cloud (e.g., a similar outline), such as a "horse."

The image evaluation program 110 may also utilize one or more user characteristics (e.g., characteristics of the user) in identifying one or more similar individual objects. User characteristics may be received and/or requested by the image evaluation program 110 prior to utilizing the one or more user characteristics in identifying one or more similar individual objects within other images. For example, user characteristics may include visual impairments such as red-green colorblindness such that the one or more similar individual objects identified may be user specific. The similarity threshold may be based on at least the one or more properties of the one or more individual objects of the image and/or the one or more user characteristics.

The image evaluation program 110 may identify the one or more similar individual objects utilizing at least the classification techniques outline above and/or by searching the knowledge corpus (e.g., database 114) maintained by the image evaluation program 110, wherein the knowledge corpus (e.g., database 114) may store a plurality of images and/or individual objects extracted from images as well as the associated meaning for each of the one or more individual objects extracted from the image. The image evaluation program 110 may determine the associated meaning for each of the one or more similar individual objects in which the similarity rises above a similarity threshold. The image evaluation program 110 may utilize the associated meaning for each of the one or more similar individual objects in which the similarity rises above the similarity threshold in determining one or more alternative associated meanings for the individual object extracted from the image. The image evaluation program 110 may utilize at least Semantic Textual Similarity (STS) to identify additional associated meanings semantically similar to the associated meaning and the one or more alternative associated meanings for each of the one or more individual objects.

For example, the image evaluation program 110 may extract Individual Object 1 from Image 1. The image evaluation program 110 may utilize the pre-trained classifiers of the one or more image analysis tools in determining the associated meaning for Individual Object 1. The associated meaning for Individual Object 1 may be X. The image evaluation program 110 may then identify one or more similar individual objects based on the properties of Individual Object 1. The image evaluation program 110 identify both Individual Object 2 and Individual Object 3 from the knowledge corpus (e.g., database 114) with both Individual Object 2 and Individual Object 3 exceeding the similarity threshold. The associated meaning for Individual Object 2 may be Y and the associated meaning for Individual Object 3 may be Z. Accordingly, the image evaluation program 110 may determine the associated meaning for Individual Object 1 is X, and the alternative associated meaning for Individual Object 1 is Y and Z.

At 204, the image evaluation program 110 determines a general sentiment for each of the one or more individual objects of the image. The image evaluation program 110 may determine the general sentiment for each of the one or more individual objects of the image by performing a sentiment analysis on at least textual content and/or audio/visual content associated with each of the one or more individual objects of the image. The image evaluation program 110 may identify textual content and/or audio visual content associated with an individual object of the image using at least, the one or more properties of the individual object, the one or more similar individual objects, the associated meaning of the individual object, and/or the one or more alternative associated meanings of the individual object. As will be explained in more detail below with respect to Step 206, the textual and/or audio visual content analyzed in determining the general sentiment for each of the one or more individual objects may not include textual and/or audio/visual content associated with the user.

The image evaluation program 110 may determine the general sentiment for each of the one or more individual objects of the image by performing a sentiment analysis on at least textual content and/or audio/visual content which may include at least the associated meaning and/or one or more alternative associated meanings for each of the one or more similar individual objects. The image evaluation program 110 may utilize one or more content identification mechanisms in identifying the textual and/or audio visual content associated with each of the one or more individual objects of the image, such as, but not limited to, a web-crawler and/or other search mechanism, IBM Watson® Speech Recognition (IBM Watson® and all Watson-based trademarks are trademarks or registered trademarks of International Business Machines Corporation n the United States, and/or other countries), IBM Watson® Speech to Text, IBM Watson® Text to Speech, amongst other content identification mechanisms.

Textual content may include, but is not limited to including, headlines, messages, phrases, social media posts, articles, or other bodies of textual content which include at least the associated meaning and/or one or more alternative associated meanings for each of the one or more similar individual objects. The sentiment analysis of the textual content may include, at least, polarity classification, sentiment classification according to a pre-defined set of emotional states, subjectivity/objectivity identification, and/or feature/aspect-based sentiment analysis. The sentiment analysis of the textual content may be determined based on words, punctuation, tone, amongst other factors of text associated with the associated meaning and/or one or more alternative associated meanings.

The audio/visual content may include at least, visual content in which the one or more individual objects of the image may be identified, audio content in which the associated meaning and/or one or more alternative associated meanings may be identified, amongst other audio/visual content. The image evaluation program 110 may identify the associated meaning and/or one or more alternative associated meanings in the audio content utilizing one or more linguistic techniques, such as, but not limited to IBM Watson® Speech to Text (IBM Watson® and all Watson-based trademarks are trademarks or registered trademarks of international Business Machines Corporation in the United States, and/or other countries). The sentiment analysis of the audio/visual content may include, but is not limited to including, analysis of audio to detect at least, volume, tone, and/or inflection.

The sentiment analysis of the audio/visual content may include, but is not limited to including, analysis of video to detect at least, a gesture (e.g., using gesture detection) and/or an emotion (e.g., using emotion detection). Furthermore, the sentiment analysis of the audio/visual content may additionally include analysis of text associated with the audio/visual content in which at least the one or more individual objects of the image and/or the one or more similar individual objects in which the similarity score rises above the similarity threshold are identified.

The image evaluation program 110 may utilize one or more sentiment analysis tools in determining the general sentiment for each of the one or more individual objects of the image, such as, but not limited to, Natural Language Processing (NLP) techniques, such as those implemented in IBM Watson® (IBM Watson® and all Watson-based trademarks are trademarks or registered trademarks of International Business Machines Corporation in the United States, and/or other countries), IBM Watson® Tone Analyzer, IBM Watson® Natural Language Understanding, IBM Watson® Natural Language Processing, amongst other sentiment analysis tools.

The image evaluation program 110 may determine the general sentiment for each of the one or more individual objects of the image based on at least the sentiment of the associated meaning of the individual object as well as the sentiment of the one or more alternative associated meanings of the one or more similar individual objects. The image evaluation program 110 may determine a sentiment (i.e., negative, neutral, positive) and/or a general sentiment score to each of the one or more individual objects of the image. The general sentiment score may be a numerical value, for example, between 0 and 1, where 0 may be the most positive sentiment, 0.5 may be a neutral sentiment, and 1 may be the most negative sentiment. The general sentiment of the individual object may be determined based at least on the sentiment of the associated meaning of the individual object and weighted based on the sentiment of each of the one or more alternative associated meanings of the one or more similar individual objects. The image evaluation program 110 may weight the sentiment for each of the one or more alternative associated meanings of the individual object based on the similarity of the corresponding similar individual object to the individual object of the image, as described above with respect to Step 202. The image evaluation program 110 may also assign a confidence score to the general sentiment score for each of the one or more individual objects.

Continuing with the above example, the image evaluation program 110 may determine the Associated Meaning X for Individual Object 1 has a neutral sentiment of 0.5, the Associated Meaning Y for Individual Object 2 has a positive sentiment of 0.25, and the Associated Meaning Z for Individual Object 3 has a negative sentiment of 0.75. While both Individual Object 2 and Individual Object 3 exceed the similarity threshold, Individual Object 3 has a higher similarity to Individual Object 1 than Individual Object 2. Accordingly, the image evaluation program 110 may determine the general sentiment for Individual Object 1 of Image 1 has a negative general sentiment, with the general sentiment score for Individual Object 1 of Image 1 being greater than 0.5.

The image evaluation program 110 may also weight the general sentiment for each of the one or more individual objects of the image based on metadata extracted from at least the textual content and/or audio/visual content utilized in determining the general sentiment. Metadata extracted from the textual content and/or audio/visual content may include, but is not limited to including, titles, tags, categories, creator, time of creation, time of modification, other time stamps, number of views, engagement with the content, amongst other metadata.

Continuing with the above example, the Associated Meaning X for Individual Object 1 may have a neutral sentiment of 0.5, however, based on the metadata extracted from the content utilized in determining the neutral sentiment of 0.5, the more recent content has an overwhelmingly negative sentiment although Associated Meaning X historically has a positive sentiment. Accordingly, the image evaluation program 110 may determine a negative sentiment of 0.7 for Associated Meaning X by weighting the negative sentiment of the more recent content disproportionally to the historically positive sentiment.

At 206, the image evaluation program 110 determines a personal sentiment for each of the one or more individual objects of the image. The image evaluation program 110 may determine the personal sentiment for each of the one or more individual objects of the image by performing a sentiment analysis on at least user content (e.g., textual content and audio/visual content), user information, and/or biometric sensor data. The image evaluation program 110 may utilize at least the content identification mechanisms and sentiment analysis tools described above with respect to Step 204 in determining the personal sentiment for each of the one or more individual objects of the image.

The image evaluation program 110 may determine the personal sentiment for each of the one or more individual objects of the image by performing a sentiment analysis on at least user content (e.g., textual content and audio/visual content), user information, and/or user biometric sensor data. The image evaluation program 110 may receive and/or request permission from the user prior to utilizing at least the user content (e.g., textual content and audio/visual content), user information, and/or user biometric data in determining the personal sentiment for each of the one or more individual objects of the image. User content (e.g., textual content and audio/visual content) may include, but is not limited to including, textual content, audio content, and visual content, the user has shared, created, posted, or otherwise engaged with and/or disseminated. User information may include, but is not limited to including, any information received from the user, any information derived from a social media profile and/or professional profile of the user, such as groups, likes, favorites, interests, amongst other information. User biometric data may include, but is not limited to including, biometric sensor data received from a smart wearable device of the user, typing speed, click actions, skin conductance, pressure applied to a touchscreen of client computer 102, amongst other biometric data. The image evaluation program 110 may determine the personal sentiment utilizing the user biometric data based on changes identified in the biometric data as compared to previously recorded biometric data, the previously recorded biometric data of the user being stored in the knowledge corpus (e.g., database).

The image evaluation program 110 may utilize the one or more sentiment analysis tools outline above with respect to Step 204 in determining the personal sentiment for each of the one or more individual objects of the image. The image evaluation program may determine the personal sentiment for each of the one or more individual objects of the image utilizing at least the user content, user information, and/or user biometric sensor data to determine the sentiment of the associated meaning of the individual object as well as the sentiment of the one or more alternative associated meanings of the one or more similar individual objects. The image evaluation program 110 may weight the sentiment for each of the one or more alternative associated meanings of the individual object based on the similarity of the corresponding similar individual object to the individual object of the image, as described above with respect to Step 202. The image evaluation program 110 may store the personal sentiment score for each individual object in the knowledge corpus (e.g., database 114). The image evaluation program 110 may utilize the personal sentiment scores stored in the knowledge corpus (e.g. database 114) to detect changes in user sentiment over time. The image evaluation program 110 may also assign a confidence score to the personal sentiment score for each of the one or more individual objects. The confidence score may be a numerical value between 0 and 1, wherein a score of 0.9 for example, is high confidence.

For example, the image evaluation program 110 may extract Individual Object 1 from Image 1. The image evaluation program 110 may determine the Associated Meaning for Individual Object 1 is X. The image evaluation program 110 may identify two similar individual objects above the similarity threshold, Individual Object 2 and Individual Object 3. The associated meaning for Individual Object 2 may be Y and the associated meaning for Individual Object 3 may be Z. In determining the personal sentiment for Individual Object 1 the image evaluation program 110 may utilize at least the user content, user information, and/or user biometric sensor data in determining the sentiment of Associated Meaning X and Alternative Associated Meaning Y and Z. There may be no user content or user information with respect to Associated Meaning X and Alternative Associated Meaning Y and Z. However, the user was recently exposed to an article relating to Alternative Associated Meaning Y and the biometric sensor data from the time user was exposed to the article relating to Alternative Associated Meaning Y indicates a spike in the user's blood pressure. The image evaluation program 110 may determine Alternative Associated Meaning Y has a negative sentiment and a personal sentiment score of 0.9. The image evaluation program 110 may assign a confidence score of 0.2 to the personal sentiment score of 0.9 for Alternative Associated Meaning Y. Accordingly, the image evaluation program 110 may determine the personal sentiment score for the Individual Object 1 is 0.7 with a confidence score of 0.05. The image evaluation program 110 may have utilized a 0.5 neutral personal sentiment score for both Associated Meaning X and Alternative Associated Meaning Z because of no user content, user information, and/or biometric sensor data relating to either. Additionally, the confidence score of 0.2 for the personal sentiment score of 0.9 for Alternative Associated Meaning Y may have been weighted based on the similarity of Alternative Associated Meaning Y to Associated Meaning X.

In an embodiment, the image evaluation program 110 may continuously update the confidence score corresponding to the personal sentiment score for each of the one or more individual objects. For example, based on the user biometric data the image evaluation program 110 may determine a high negative sentiment score for 5 images in which each of the 5 images includes an individual object with the same associated meaning. The image evaluation program 110 may increase the confidence score with respect to each personal sentiment score for the associated meaning.

At 208, the image evaluation program 110 generates an overall sentiment score for the image. The image evaluation program 110 may generate the overall sentiment score for the image based on at least the general sentiment score for each of the one or more individual objects of the image and the personal sentiment score for each of the one or more individual objects of the image.

The image evaluation program 110 may weight the general sentiment score and the personal sentiment score for each of the one or more individual objects based on at least the confidence score for each general sentiment score and the confidence score for each personal sentiment score.

In an embodiment, the image evaluation program 110 may weight a negative sentiment determined for the one or more individual objects of the image more than a positive and/or neutral sentiment of the one or more individual objects in generating the overall sentiment score for the image.

For example, the image evaluation program 110 may extract Individual Object 1, 2, and 3 from Image 1. The image evaluation program 110 may determine the Associated Meaning for Individual Object 1 is A, and the Alternative Associated Meanings for Individual Object 1 is B and C. The image evaluation program 110 may determine based on the general sentiment score and the personal sentiment score for Associated Meaning A and Alternative Associated Meaning B and C that the overall sentiment score for Individual Object 1 is 0.75, negative sentiment, and the confidence score for the overall sentiment of Individual Object 1 is 0.8. The image evaluation program may determine the Associated Meaning for Individual Object 2 is D, and the Alternative Associated Meaning for Individual Object 2 is E. The image evaluation program 110 may determine based on the general sentiment score and the personal sentiment score for Associated Meaning D and Alternative Associated Meaning E that the overall sentiment score for Individual Object 2 is 0.25, positive sentiment, and the confidence score for the overall sentiment of Individual Object is 0.8. The image evaluation program 110 may determine the Associated Meaning for Individual Object 3 is F, and the image evaluation program 110 may not identify one or more similar individual objects to Individual Object 3 rising above the similarity threshold and accordingly no Alternative Associated Meanings for Individual Object 3. The image evaluation program 110 may determine based on the general sentiment score and the personal sentiment score for Associated Meaning F of Individual Object 3 that the overall sentiment score for Individual Object 3 is 0.5, neutral sentiment, and the confidence score for the overall sentiment of Individual Object 3 is 0.9. The image evaluation program 110 may, based on the overall sentiment scores for the one or more individual objects of the image, generate an overall sentiment score for Image 1 with a negative sentiment (i.e., greater than 0.5) even though the overall sentiment scores for the one or more individual objects (0.25, 0.75, and 0.5) average to 0.5, based on weighting of the negative sentiment overall sentiment score of Individual Object 1 with a corresponding high confidence score.

At 210, the image evaluation program 110 determines whether the overall sentiment score for the image exceeds a personal threshold. The personal threshold may be determined in real time. As will be explained in more detail with respect to Step 214, the personal threshold may be utilized by the image evaluation program 110 in determining whether to provide one or more improvement mechanisms to the user.

The image evaluation program 110 may utilize a machine learning model in determining the personal threshold of the user. The machine learning model may utilize at least real time data in determining the personal threshold of the user. Real time data may include, but is not limited to including, real time biometric sensor data, body language, tone and/or sentiment of recent messages and/or posts by a user, current weather in a user location, time of day in a user location, number of events and/or meetings on a user calendar, amongst other real time data. The machine learning model may compare the real time data with data stored in the knowledge corpus (e.g., database 114) in determining the personal threshold of the user. Real time data may be accessed based on permissions of the user. The machine learning model may continuously update the personal threshold of the user based on the real time data. The machine learning model may continuously update the personal threshold of the user in predetermined time increments and/or as real time data is received and/or updated.

For example, the overall sentiment score for Image A may be 0.6, which is a slightly negative sentiment. At Time 1 the user real time biometric sensor data received from a smart wearable device of the user may show an elevated heart rate and/or blood pressure and the user calendar may show an event beginning in 10 minutes. The machine learning model may determine the heat rate and/or blood pressure is elevated for the user based on a comparison with previously recorded user biometric data stored in the knowledge corpus (e.g., database 114). At Time 1 the overall sentiment score for Image A may exceed the personal threshold of the user determined by the machine learning model. As will be explained in more detail below with respect to Step 214, at Time 1 the image evaluation program 110 may provide one or more improvements mechanisms to the user with respect to Image A. At Time 2, later that day after the event on the user calendar the biometric sensor data received from the smart wearable device of the user may show a stable heart rate and/or blood pressure. At Time 2 the overall sentiment score for Image A may not exceed the personal threshold of the user determined by the machine learning model. As will be explained in more detail below with respect to Step 212, at Time 2 the image evaluation program 110 may not provide one or more improvement mechanisms to the user with respect to Image A. The image evaluation program 110 may monitor real time data corresponding to Image A to update the machine learning model.

The machine learning model may utilize a numerical value for the personal threshold of the user. The machine learning model may utilize a numerical value between 0 and 1 for the personal threshold of the user, wherein 0 may represent the lowest personal threshold and 1 may represent the highest personal threshold. The image evaluation program 110 may utilize the numerical value of the personal threshold of the user in determining whether the overall sentiment score for the image exceeds the personal threshold. Continuing with the above example, at Time 1 the personal threshold of the user may have been 0.4 and the personal threshold of the user may have been 0.7 at Time 2.

In an embodiment, the image evaluation program 110, may generate one or more sample images in which the user may provide feedback. The feedback from the user may indicate whether a user would like to be provided one or more improvement mechanisms, such as, but not limited to, a warning, before viewing similar images in the future. The image evaluation program 110 may utilize the feedback received from the user to train the machine learning model.

If the image evaluation program 110 determines the overall sentiment score does not exceed the personal threshold of the user, the image evaluation program 110 proceeds to Step 212. If the image evaluation program 110 determines the overall sentiment score does exceed the personal threshold of the user, the image evaluation program 110 proceeds to Step 214.

At 212, if the overall sentiment score for the image does not exceed the personal threshold of the user the image evaluation process ends. The image evaluation program 110 may not provide one or more improvement mechanisms to the user with respect to the image if the overall sentiment score for the image does not exceed the personal threshold of the user.

In an embodiment, the image evaluation program 110 may monitor at least user activity and/or user biometric sensor data corresponding to the image. The image evaluation program 110 may determine the user activity and/or biometric sensor data corresponding to the image utilizing at least, screen monitoring, time stamps of user content, time stamps of changes in the user biometric sensor data, amongst other techniques. The image evaluation program 110 may utilize the data corresponding to the image to at least, update the personal sentiment score for the image and/or individual objects of the image, update the confidence score for the sentiment score for each of the one or more individual objects of the image, and retrain the machine learning model utilized in determining the personal threshold of the user.

At 214, if the overall sentiment score for the image does exceed the personal threshold of the user the image evaluation program 110 provides one or more improvement mechanisms to the user. The image evaluation program 110 may provide the one or more improvement mechanisms to the user prior to the user viewing and/or being exposed to the image.

The one or more improvement mechanisms may include, but are not limited to including, a sensitive subject matter warning, blurring of an image, blurring of one or more individual objects of the image, editing of the one or more individual objects of the image to reduce the similarity with the one or more similar individual objects with a negative sentiment, altering the one or more properties of an individual object such that the overall sentiment score for the image is adjusted below the personal threshold of the user, amongst other improvement mechanisms. The image evaluation program 110 may display a notification to the user if the image has been edited, altered, or refined in any way.

In an embodiment, the image evaluation program 110 may provide one or more image insights to the user prior to the user disseminating an image. Image insights may include, but are not limited to including, the general sentiment for a network of the user with respect to the image, number of users within the network of the user in which the image would exceed the personal threshold, the general sentiment score of the image, amongst other insights. The one or more image insights may be performed separated with respect to one or more social media platforms and/or one or more unique accounts of the user with respect to each of the one or more social media platforms. The image evaluation program 110 may provide the one or more insights to the user utilizing one or more recommendations. For example, the image evaluation program may recommend Image X be uploaded to Social Media Platform A as opposed to Social Media Platform B based on a comparison of the general sentiment for Image X between the network of the user on Social Media Platform A compared to the network of the user on Social Media Platform B.

It may be appreciated that FIG. 2 and provides only an illustration of one embodiment and do not imply any limitations with regard to how different embodiments may be implemented. Many modifications to the depicted embodiment(s) may be made based on design and implementation requirements.

Figure 3:
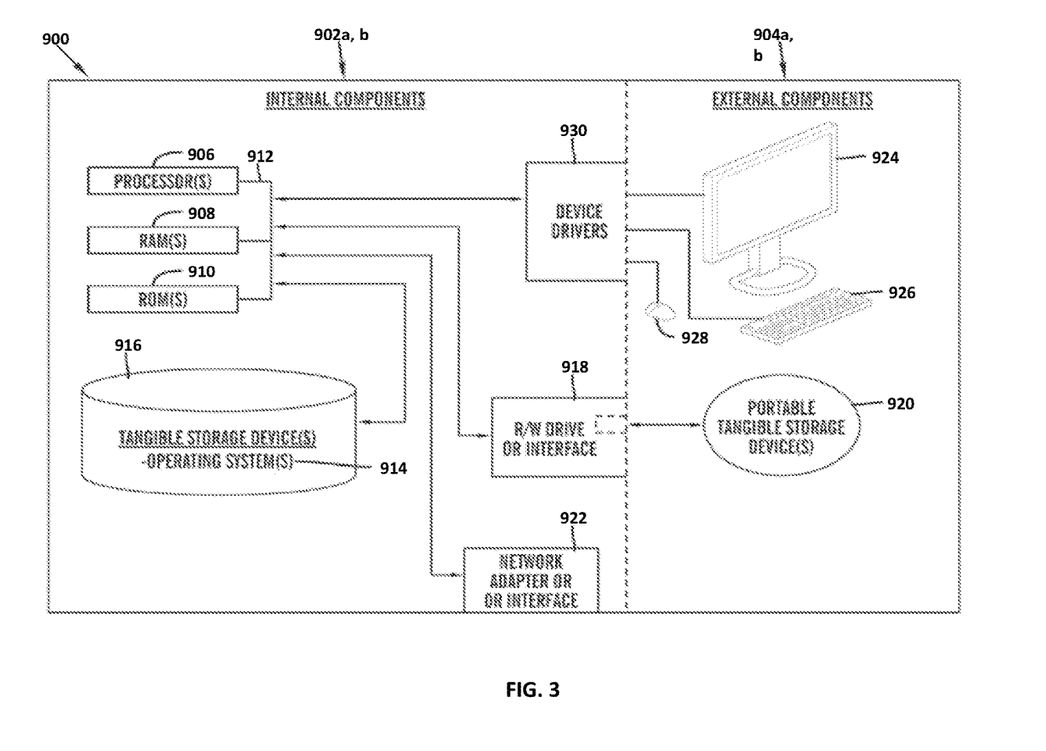
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the image evaluation program 110a in client computer 102, and the image evaluation program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the image evaluation program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the image evaluation program 110a in client computer 102 and the image evaluation program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the image evaluation program 110a in client computer 102 and the image evaluation program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
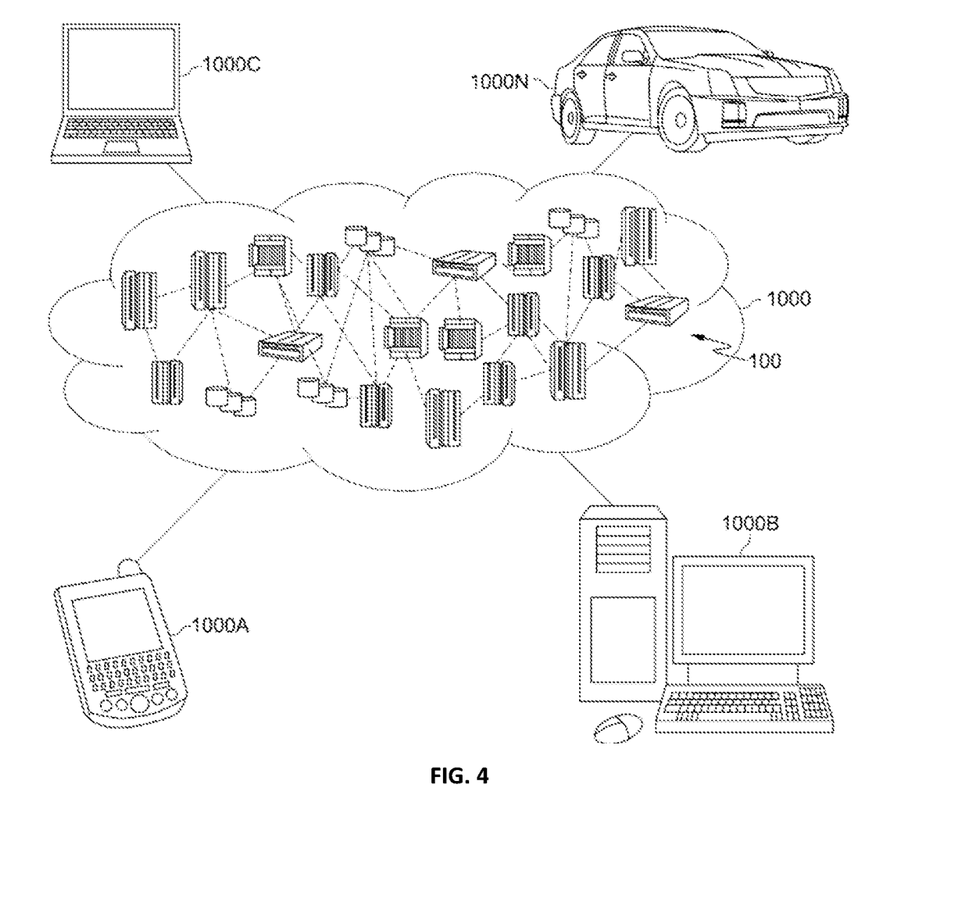
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
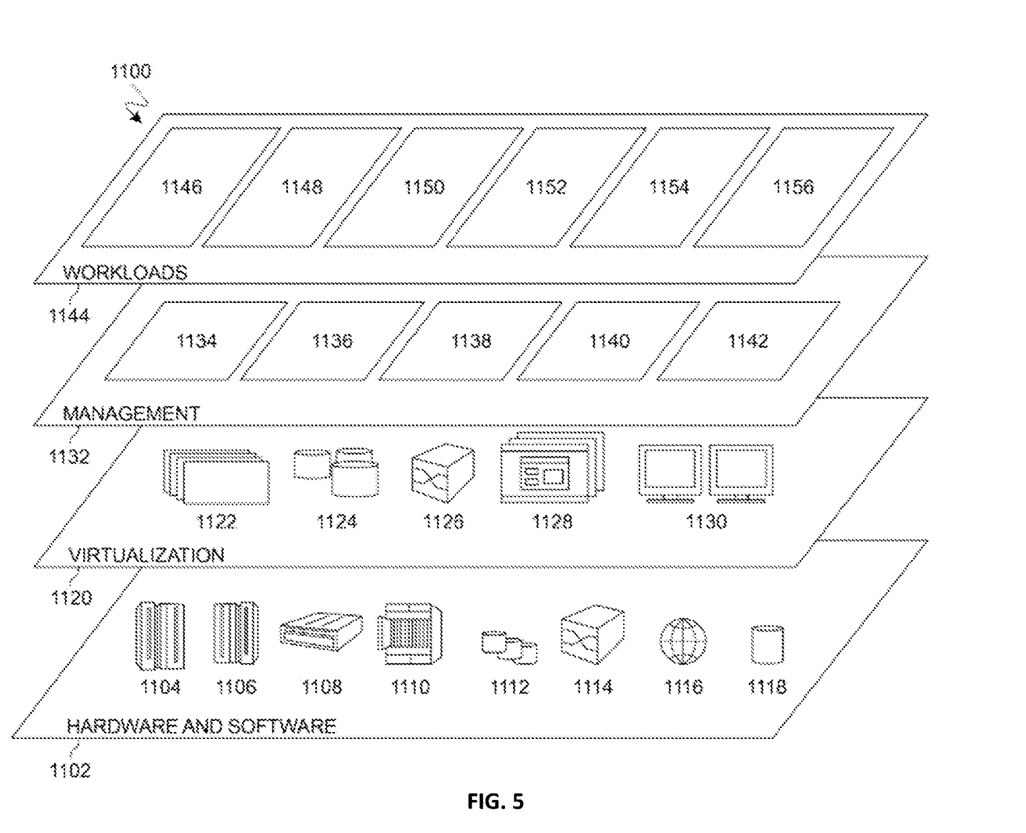
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized.

Examples of workloads and functions which may be provided from this layer include: mapping and navigation 1146; software development and lifecycle management 1148; virtual classroom education delivery 1150; data analytics processing 1152; transaction processing 1154; and the image evaluation program 1156. An image evaluation program 110a, 110b provides a way to provide one or more improvement mechanisms to a user prior to viewing an image to reduce an unprepared invocation of stress and/or other negative reaction.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure shall not be construed as to violate or encourage the violation of any local, state, federal, or international law with respect to privacy protection.

What is claimed is:

1. A method for image evaluation, the method comprising:
    extracting one or more individual objects from an image;
    determining an associated meaning and one or more alternative associated meanings for each of the one or more individual objects extracted from the image, wherein each of the one or more alternative associated meanings share at least one property above a similarity threshold with the associated meaning;
    determining a general sentiment score for each of the one or more individual objects;
    determining a personal sentiment score for each of the one or more individual objects;
    generating an overall sentiment score for the image based on at least the general sentiment score for each of the one or more individual objects and the personal sentiment score for each of the one or more individual objects;
    determining the overall sentiment score for the image exceeds a personal threshold of a user; and
    providing one or more improvement mechanisms to the user, wherein the one or more improvement mechanisms includes at least adjusting one or more properties of at least one individual object of the image with a negative sentiment to reduce a similarity between the at least one individual object of the image and the one or more similar individual objects with the negative sentiment such that the overall sentiment score for the image is adjusted below the personal threshold of the user.

2. The method of claim 1, wherein the general sentiment score for each of the one or more individual objects is determined by analyzing content unassociated with the user and is based on a general sentiment score for the associated meaning and a general sentiment score for each of the one or more alternative associated meanings, wherein the general sentiment scores are determined based on a sentiment analysis of at least, one or more of, textual content, audio content, visual content, or metadata extracted from the image, for the associated meaning and each of the one or more alternative associated meanings.

3. The method of claim 2, wherein determining the associated meaning and the one or more alternative associated meanings for each of the one or more individual objects further comprises:
    identifying one or more similar individual objects for each of the one or more individual objects of the image; and
    determining the one or more alternative associated meanings for each of the one or more individual objects based on the associated meaning of the one or more similar individual objects, wherein a specificity of the associated meaning for each of the one or more individual objects is increased as additional images are analyzed.

4. The method of claim 3, wherein identifying the one or more similar individual objects further comprises:
    utilizing one or more properties of the one or more individual objects to identify the one or more similar individual objects exceeding a similarity threshold, wherein the similarity threshold is based on one or more user characteristics specific to the user.

5. The method of claim 1, wherein the personal threshold of the user is determined in real time based on at least a comparison of real time biometric data and previously recorded biometric data stored in a knowledge corpus by a machine learning model, wherein the machine learning model continuously updates the personal threshold of the user as additional real time data is received.

6. The method of claim 5, further comprising:
    generating one or more sample images;
    receiving feedback from the user; and
    training the machine learning model using the feedback received from the user.

7. The method of claim 1, wherein the adjusting one or more properties of at least one individual object of the image reduces the similarity of the at least one individual object with the one or more similar individual objects with the one or more alternative associated meanings with the negative sentiment, and wherein a notification is displayed to the user that the at least one individual object of the image is adjusted.

8. The method of claim 1, wherein determining the personal sentiment score for each of the one or more individual objects further comprises:
    performing a sentiment analysis on user content for the associated meaning and the one or more alternative associated meanings for each of the one or more individual objects, wherein the personal sentiment score for each of the one or more individual objects is determined based on a personal sentiment score for the associated meaning and a personal sentiment score for each of the one or more alternative associated meanings; and
    weighting the personal sentiment score for each of the one or more alternative associated meanings based on a similarity between the one or more individual objects and one or more similar individual objects.

9. The method of claim 8, wherein the personal sentiment score for each of the one or more individual objects is determined using one or more sentiment analysis tools and stored in a knowledge corpus, wherein a confidence score corresponding to the personal sentiment score for each of the one or more individual objects is continuously updated, wherein the personal sentiment score for each of the one or more individual objects stored in the knowledge corpus are utilized in detecting changes to the personal sentiment for each of the one or more individual objects over time.

10. A computer system for image evaluation, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   extracting one or more individual objects from an image;
   determining an associated meaning and one or more alternative associated meanings for each of the one or more individual objects extracted from the image, wherein each of the one or more alternative associated meanings share at least one property above a similarity threshold with the associated meaning;
   determining a general sentiment score for each of the one or more individual objects;
   determining a personal sentiment score for each of the one or more individual objects;
   generating an overall sentiment score for the image based on at least the general sentiment score for each of the one or more individual objects and the personal sentiment score for each of the one or more individual objects;
   determining the overall sentiment score for the image exceeds a personal threshold of a user; and
   providing one or more improvement mechanisms to the user, wherein the one or more improvement mechanisms includes at least adjusting one or more properties of at least one individual object of the image with a negative sentiment to reduce a similarity between the at least one individual object of the image and the one or more similar individual objects with the negative sentiment such that the overall sentiment score for the image is adjusted below the personal threshold of the user.

11. The computer system of claim 10, wherein the general sentiment score for each of the one or more individual objects is determined by analyzing content unassociated with the user and is based on a general sentiment score for the associated meaning and a general sentiment score for each of the one or more alternative associated meanings, wherein the general sentiment scores are determined based on a sentiment analysis of at least, one or more of, textual content, audio content, visual content, or metadata extracted from the image, for the associated meaning and each of the one or more alternative associated meanings.

12. The computer system of claim 11, wherein determining the associated meaning and the one or more alternative associated meanings for each of the one or more individual objects further comprises:
   identifying one or more similar individual objects for each of the one or more individual objects of the image; and
   determining the one or more alternative associated meanings for each of the one or more individual objects based on the associated meaning of the one or more similar individual objects, wherein a specificity of the associated meaning for each of the one or more individual objects is increased as additional images are analyzed.

13. The computer system of claim 12, wherein identifying the one or more similar individual objects further comprises:
   utilizing one or more properties of the one or more individual objects to identify the one or more similar individual objects exceeding a similarity threshold, wherein the similarity threshold is based on one or more user characteristics specific to the user.

14. The computer system of claim 10, wherein the personal threshold of the user is determined in real time based on at least a comparison of real time biometric data and previously recorded biometric data stored in a knowledge corpus by a machine learning model, wherein the machine learning model continuously updates the personal threshold of the user as additional real time data is received.

15. The computer system of claim 10, wherein the adjusting one or more properties of at least one individual object of the image reduces the similarity of the at least one individual object with the one or more similar individual objects with the one or more alternative associated meanings with the negative sentiment, and wherein a notification is displayed to the user that the at least one individual object of the image is adjusted.

16. A computer program product for image evaluation, comprising:
   one or more non-transitory computer-readable storage media and program instructions stored on at least one of the one or more tangible storage media, the program instructions executable by a processor to cause the processor to perform a method comprising:
      extracting one or more individual objects from an image;
      determining an associated meaning and one or more alternative associated meanings for each of the one or more individual objects extracted from the image, wherein each of the one or more alternative associated meanings share at least one property above a similarity threshold with the associated meaning;
      determining a general sentiment score for each of the one or more individual objects;
      determining a personal sentiment score for each of the one or more individual objects;
      generating an overall sentiment score for the image based on at least the general sentiment score for each of the one or more individual objects and the personal sentiment score for each of the one or more individual objects;
      determining the overall sentiment score for the image exceeds a personal threshold of a user; and
      providing one or more improvement mechanisms to the user, wherein the one or more improvement mechanisms includes at least adjusting one or more properties of at least one individual object of the image with a negative sentiment to reduce a similarity between the at least one individual object of the image and the one or more similar individual objects with the negative sentiment such that the overall sentiment score for the image is adjusted below the personal threshold of the user.

17. The computer program product of claim 16, wherein the general sentiment score for each of the one or more individual objects is determined by analyzing content unassociated with the user and is based on a general sentiment score for the associated meaning and a general sentiment score for each of the one or more alternative associated meanings, wherein the general sentiment scores are determined based on a sentiment analysis of at least, one or more of, textual content, audio content, visual content, or metadata extracted from the image, for the associated meaning and each of the one or more alternative associated meanings.

18. The computer program product of claim 17, wherein determining the associated meaning and the one or more alternative associated meanings for each of the one or more individual objects further comprises:
  identifying one or more similar individual objects for each of the one or more individual objects of the image using one or more properties of the one or more individual objects to identify the one or more similar individual objects exceeding a similarity threshold, wherein the similarity threshold is based on one or more user characteristics; and
  determining the one or more alternative associated meanings for each of the one or more individual objects based on the associated meaning of the one or more similar individual objects, wherein a specificity of the associated meaning for each of the one or more individual objects is increased as additional images are analyzed.

19. The computer program product of claim 16, wherein the personal threshold of the user is determined in real time based on at least a comparison of real time biometric data and previously recorded biometric data stored in a knowledge corpus by a machine learning model, wherein the machine learning model continuously updates the personal threshold of the user as additional real time data is received.

20. The computer program product of claim 16, wherein the adjusting one or more properties of at least one individual object of the image reduces the similarity of the at least one individual object with the one or more similar individual objects with the one or more alternative associated meanings with the negative sentiment, and wherein a notification is displayed to the user that the at least one individual object of the image is adjusted.

21. A method for image sentiment analysis, the method comprising:
  extracting one or more individual objects from an image to be shared by a user on one or more social media platforms;
  identifying one or more similar individual objects for each of the one or more individual objects of the image based on at least one or more properties of an individual object;
  determining an associated meaning and one or more alternative associated meanings for each of the one or more individual objects, wherein the associated meaning is determined based on the individual object and the one or more alternative associated meanings is based on the one or more similar individual objects;
  determining a network specific sentiment score for each of the one or more individual objects based on a sentiment score of the associated meaning and a sentiment score of the one or more alternative associated meanings for each of the one or more social media platforms, wherein the sentiment score of the one or more alternative associated meanings is weighted based on a similarity with the individual object;
  determining an overall sentiment score for the image for each of the one or more social media platforms based on the network specific sentiment score for each of the one or more individual objects of the image, wherein the overall sentiment score for the image exceeds a threshold for a network specific sentiment analysis of at least one of the one or more social media platforms; and
  providing one or more image insights and one or more improvement mechanisms to the user prior to the user disseminating the image on the one or more social media platforms, wherein the image insights include at least the network specific sentiment analysis for the image for each account of the user corresponding to each of the one or more social media platforms, and wherein the one or more improvement mechanisms includes at least adjusting one or more properties of at least one individual object of the image with a negative sentiment to reduce a similarity between the at least one individual object of the image and the one or more similar individual objects with negative sentiment such that the overall sentiment score for the image is adjusted below the threshold for the network specific sentiment analysis of the at least one of the one or more social media platforms.

22. A computer system for image sentiment analysis, comprising:
  one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    extracting one or more individual objects from an image to be shared by a user on one or more social media platforms;
    identifying one or more similar individual objects for each of the one or more individual objects of the image based on at least one or more properties of an individual object;
    determining an associated meaning and one or more alternative associated meanings for each of the one or more individual objects, wherein the associated meaning is determined based on the individual object and the one or more alternative associated meanings is based on the one or more similar individual objects;
    determining a network specific sentiment score for each of the one or more individual objects based on a sentiment score of the associated meaning and a sentiment score of the one or more alternative associated meanings for each of the one or more social media platforms, wherein the sentiment score of the one or more alternative associated meanings is weighted based on a similarity with the individual object;
    determining an overall sentiment score for the image for each of the one or more social media platforms based on the network specific sentiment score for each of the one or more individual objects of the image, wherein the overall sentiment score for the image exceeds a threshold for a network specific sentiment analysis of at least one of the one or more social media platforms; and
    providing one or more image insights and one or more improvement mechanisms to the user prior to the user disseminating the image on the one or more social media platforms, wherein the image insights include at least the network specific sentiment analysis for the image for each account of the user corresponding to each of the one or more social media platforms, and wherein the one or more improvement mechanisms includes at least adjusting one or more properties of at least one individual object of the image with a negative sentiment to reduce a similarity between the at least one individual object of the image and the one or more similar individual objects with negative sentiment such that the overall sentiment score for the image is adjusted below the threshold for the network specific sentiment analysis of the at least one of the one or more social media platforms.

\* \* \* \* \*